(12) United States Patent
Cutrona et al.

(10) Patent No.: US 10,550,795 B2
(45) Date of Patent: Feb. 4, 2020

(54) CYLINDER HEAD COVER

(71) Applicant: Mahle International GmbH, Stuttgart (DE)

(72) Inventors: Roberto Cutrona, Backnang (DE); Thomas Flender, Eberdingen (DE); Michael Kreisig, Gerlingen (DE)

(73) Assignee: Mahle International GmbH (DE)

( * ) Notice: Subject to any disclaimer, the term of this patent is extended or adjusted under 35 U.S.C. 154(b) by 67 days.

(21) Appl. No.: 15/370,716

(22) Filed: Dec. 6, 2016

(65) Prior Publication Data

US 2017/0159605 A1 Jun. 8, 2017

(30) Foreign Application Priority Data

Dec. 7, 2015 (DE) .................... 10 2015 224 440

(51) Int. Cl.
*F02F 7/00* (2006.01)
*B29C 45/14* (2006.01)
(Continued)

(52) U.S. Cl.
CPC ........ *F02F 7/006* (2013.01); *B29C 45/14819* (2013.01); *F02F 7/0085* (2013.01);
(Continued)

(58) Field of Classification Search
CPC .......... B29C 45/14819; B29K 2705/00; B29L 2031/04; F01L 1/02; F01L 1/053;
(Continued)

(56) References Cited

U.S. PATENT DOCUMENTS 1,631,410 A * 6/1927 Fornaca ................ F01L 1/0532
123/90.22
4,438,734 A * 3/1984 Hayashi .................. F01L 1/053
123/193.5
(Continued)

FOREIGN PATENT DOCUMENTS

DE 19603692 A1 8/1997
DE 10034329 A1 1/2002
(Continued)

OTHER PUBLICATIONS

English abstract for DE-19603692.
(Continued)

*Primary Examiner* — George C Jin
*Assistant Examiner* — Teuta B Holbrook
(74) *Attorney, Agent, or Firm* — Fishman Stewart PLLC

(57) ABSTRACT

A cylinder head cover and a method for producing a cylinder head cover are disclosed. The method for producing a cylinder head cover may include: providing at least two metallic bearing bridges including a respective through-opening for mounting at least one camshaft and aligning the respective through-opening of the at least two bearing bridges axially relative to one another; connecting at least one metallic connection element to the at least two bearing bridges in a fixed manner so that the at least two bearing bridges are fixed and aligned relative to one another; and at least partially overmoulding the at least two bearing bridges and the at least one connection element with a plastic material.

19 Claims, 2 Drawing Sheets

(51) Int. Cl.
*F02F 11/00* (2006.01)
*B29K 705/00* (2006.01)
*B29L 31/04* (2006.01)
*B29L 31/00* (2006.01)

(52) U.S. Cl.
CPC .......... *F02F 7/0095* (2013.01); *F02F 11/002* (2013.01); *B29C 2045/14868* (2013.01); *B29K 2705/00* (2013.01); *B29L 2031/04* (2013.01); *B29L 2031/749* (2013.01)

(58) Field of Classification Search
CPC ....... F01L 2001/0476; F01L 2001/0537; F01L 2101/00; F01L 2103/00; F02F 11/002; F02F 7/006; F02F 7/0085; F02F 7/0095
USPC .......... 123/90.6, 193.3, 193.5, 90.16, 90.27, 123/90.31, 90.33, 90.34, 90.38; 29/888.06, 888.1, 898, 898.041, 898.043
See application file for complete search history.

(56) References Cited

U.S. PATENT DOCUMENTS

| | | | | |
|---|---|---|---|---|
| 4,754,729 A * | 7/1988 | Abe | ........................ | F01L 1/053 123/193.5 |
| 5,123,385 A * | 6/1992 | Sado | ........................ | F01L 1/02 123/193.5 |
| 5,297,506 A * | 3/1994 | Reckzugel | ............. | F01L 1/267 123/90.16 |
| 5,503,121 A * | 4/1996 | Speil | ........................ | F01L 1/143 123/90.22 |
| 6,698,400 B2 * | 3/2004 | Kurtenbach | ........... | F02M 61/14 123/470 |
| 7,775,186 B2 * | 8/2010 | Sakurai | ................ | B21D 53/845 123/90.16 |
| 8,166,940 B2 | 5/2012 | Grass et al. | | |
| 8,567,362 B2 * | 10/2013 | Hiramatsu | ............. | F01L 1/053 123/90.33 |
| 8,656,877 B2 * | 2/2014 | Hiramatsu | ........... | F01L 1/0532 123/90.27 |
| 9,810,112 B2 * | 11/2017 | Hikita | ..................... | F01M 9/101 |
| 2002/0020378 A1 * | 2/2002 | Asanomi | ................ | F01L 1/143 123/90.22 |
| 2004/0123591 A1 * | 7/2004 | Yoshida | .................... | F01N 3/34 60/305 |
| 2004/0144349 A1 * | 7/2004 | Wampula | ................ | F01L 1/053 123/90.38 |
| 2005/0211197 A1 * | 9/2005 | Fujii | ........................ | F01L 1/46 123/90.2 |
| 2005/0252470 A1 * | 11/2005 | Malek | ..................... | F01L 1/053 123/90.27 |
| 2006/0266315 A1 * | 11/2006 | Hamada | .................. | F01L 1/053 123/90.16 |
| 2008/0149064 A1 * | 6/2008 | Shibata | ..................... | F01L 1/02 123/195 A |
| 2008/0295796 A1 * | 12/2008 | Dunsch | .................. | F01L 1/053 123/195 C |
| 2009/0013949 A1 * | 1/2009 | Kumagai | ................ | F01L 1/053 123/90.38 |
| 2009/0013958 A1 * | 1/2009 | Kumagai | ................ | F01L 1/053 123/195 H |
| 2009/0165737 A1 * | 7/2009 | Kreisig | ................... | F01L 1/047 123/90.6 |
| 2010/0126452 A1 * | 5/2010 | Kim | ........................ | F01L 1/053 123/90.33 |
| 2010/0212616 A1 * | 8/2010 | Methley | ................ | F01L 1/3442 123/90.17 |
| 2011/0005490 A1 * | 1/2011 | Dunsch | .................. | F01L 1/053 123/198 E |
| 2011/0041790 A1 * | 2/2011 | Ilgeroth | .................. | F01L 1/053 123/90.27 |
| 2013/0055982 A1 * | 3/2013 | Flender | .................. | F01L 1/053 123/198 R |
| 2015/0075457 A1 * | 3/2015 | Menonna | ................ | F01L 1/047 123/90.6 |
| 2015/0251238 A1 * | 9/2015 | Wiesner | .................. | F01L 1/053 29/888.1 |
| 2016/0290182 A1 * | 10/2016 | Musha | .................... | F01L 1/053 |
| 2017/0312804 A1 * | 11/2017 | Lindner | ............... | B21D 53/845 |
| 2018/0030863 A1 * | 2/2018 | Junge | ................. | F01L 13/0036 |

FOREIGN PATENT DOCUMENTS

| | | | | |
|---|---|---|---|---|
| DE | 10331089 A1 | 2/2005 | | |
| DE | 102004026658 A1 | 12/2005 | | |
| DE | 102005062546 A1 | 7/2007 | | |
| DE | 102007063257 A1 | 7/2009 | | |
| DE | 102008007091 A1 * | 8/2009 | .............. | F01L 1/053 |
| DE | 102014106561 A1 | 11/2015 | | |
| EP | 1884629 A1 | 2/2008 | | |
| JP | 2006242107 A | 9/2006 | | |

OTHER PUBLICATIONS

English abstract for DE-10331089.
English abstract for DE-10034329.
English abstract for JP-2006242107.
English abstract for EP-1884629.
English abstract for DE-102014106561.
English abstract for DE-102004026658.
European Search Report dated May 16, 2017 related to corresponding European Patent Application No. 16199474.4.

* cited by examiner

CYLINDER HEAD COVER

CROSS-REFERENCE TO RELATED APPLICATIONS

This application claims priority to German Patent Application No. 10 2015 224 440.7, filed Dec. 7, 2015, the contents of which are hereby incorporated by reference in its entirety.

TECHNICAL FIELD

The present invention relates to a method for producing a cylinder head cover. The invention additionally relates to a cylinder head cover produced with such a method.

BACKGROUND

Usually, cylinder head covers form an upper termination of a cylinder head and often also contain bearing bridges for mounting at least one camshaft of an internal combustion engine.

From DE 10 2014 106 561 A1 a cylinder head cover for arrangement on a cylinder head of an internal combustion engine with a cover body made of plastic and with at least one bearing bridge, comprising a metal material for the rotatable receiving of at least one camshaft in the cylinder head cover is known. Here it is provided that the bearing bridge is mounted by way of a joining connection on the cover body so precisely that the same is aligned by the cover body for the arrangement on the cylinder head.

From DE 10 2007 063 257 A1 a bearing device for mounting a camshaft in a cylinder head is known, which comprises at least one engagement contour which is connectable to at least one mating engagement contour formed on a cylinder head cover in such a manner that the cylinder head cover is tightly clampable against the cylinder head cover via the bearing device. This is to achieve in particular a simple and assembly-friendly fastening of the cylinder head cover on the cylinder head.

From DE 103 31 089 A1 a cylinder head cover for an internal combustion engine with at least one camshaft is known, which projects through at least one bearing bridge along a bearing gallery for the camshaft in the cylinder head cover, wherein the bearing bridge comprises an opening or bore which completely surrounds the camshaft.

From EP 1 884 629 B1 a cylinder head cover for an internal combustion engine is known, with a housing which is sealingly connectable to the cylinder head, and which comprises at least one mounting with a fit for a function component, wherein the housing is formed of a thermoplastic and the mounting is integrated in a receiving part made of metal.

Disadvantageous with cylinder head covers known from the prior art is often their comparatively expensive and allows little flexibility.

SUMMARY

The present invention therefore deals with the problem of stating a method by means of which a cylinder head cover is producible in a simple, cost-effective yet flexible manner.

According to the invention, this problem is solved through the subject of the independent Claim(s). Advantageous embodiments are subject of the dependent claims.

The present invention is based on the general idea of connecting and thereby align essential metallic bearing elements, such as for example bearing bridges for mounting at least one camshaft, by way of likewise metallic connection elements to one another and to subsequently over mould this bearing frame in a plastic injection mould with plastic at least partially and in the process produce the cylinder head cover. The method according to the invention for producing a cylinder head cover in this case comprises at least the following method steps: initially, at least two metallic bearing bridges for mounting at least one camshaft are provided and aligned relative to one another. Following this, at least one metallic connection element is connected to the at least two bearing bridges in a fixed manner, as a result of which the aligned bearing bridges are fixed to one another or on one another and a comparatively stiff bearing frame is thereby created. This bearing frame consists of the at least two bearing bridges and the at least one connection element and is now at least partially overmoulded with plastic, for example in a plastic injection mould, and the cylinder head cover thereby produced. Through a corresponding cavity of an injection mould a wide range of shapes of cylinder head covers can thereby be created with one and the same bearing frame, as a result of which it is possible to react comparatively flexibly to different customer requirements in terms of for example outer dimension and/or sealing contours. With the method according to the invention, an assembly-ready cylinder head cover that is sealed at the same time can be provided comparatively easily, cost-effectively and flexibly, wherein in addition almost all requirements in terms of appearance, for example termination of a cylinder head to the top with a corresponding logo can be taken into account. To this end, the injection mould merely has to be suitably adapted or modified.

In an advantageous further development of the solution according to the invention, the at least one connection element is connected to a respective outer surface of the at least two bearing bridges. Because of this, an areal and thus particularly stiff connection between the at least one connection element and the at least two bearing bridges can be achieved in particular, as a result of which an altogether comparatively stiff bearing frame can be produced.

Practically, the at least one connection element and the at least two bearing bridges are welded, soldered, screwed, riveted or glued together. Additionally or alternatively, a form-fit connection between the mentioned elements is also conceivable. Likewise also conceivable are obviously bolted connections or connection by way of suitable dowels. Even this non-conclusive enumeration gives an idea of the manifold connection or fixing possibilities between the at least one connection element and the at least two bearing bridges that are available.

In an advantageous further development of the solution according to the invention, at least one opening, in particular an oil filling opening or a screw-in opening for fastening attachment units is introduced into the at least one connection element. By providing or introducing at least one such opening, individual fastening options can be realised comparatively easily. In addition, by introducing such an opening a weight reduction is achieved, as a result of which the cylinder head cover can be formed altogether lighter in weight which in the long term leads to a reduction of the fuel consumption and to a reduction of the pollutant emissions.

The present invention is based, furthermore, on the general idea of producing a cylinder head cover according to the aforementioned method, as a result of which the same cannot only be produced cost-effectively but additionally also flexibly.

In an advantageous further development of the cylinder head according to the invention, the at least one connection element comprises at least two surfaces that are angled relative to one another, which at least partially encase a respective bearing back of the bearing bridges. Because of the surfaces being aligned angled relative to one another, the connection element can have a comparatively high stiffness with low wall thickness, which is of great advantage in particular for mounting the camshaft.

Alternatively to this, at least two, preferentially three or more rail-like connection elements can also be provided, which connect the individual bearing bridges lather-like, wherein the connection elements represent the side rails of the ladder and the bearing bridges the rungs of the ladder. However, it is also conceivable alternatively thereto that the connection element per se has a lattice-like structure with longitudinal and transverse webs and even because of this has a frame-like shape which has an extremely high stiffness.

In a further advantageous embodiment of the solution according to the invention, the cylinder head cover comprises at least one sealing contour. Such a sealing contour can be arranged for example on an edge facing the cylinder head, via which the cylinder head cover is sealed vis-à-vis the cylinder head. Here, the sealing contour can be co-produced already during the injection moulding process or subsequently moulded on. In the simplest case, the sealing contour can be a sealing surface.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

It shows, in each case schematically.

DETAILED DESCRIPTION

Figure 1:
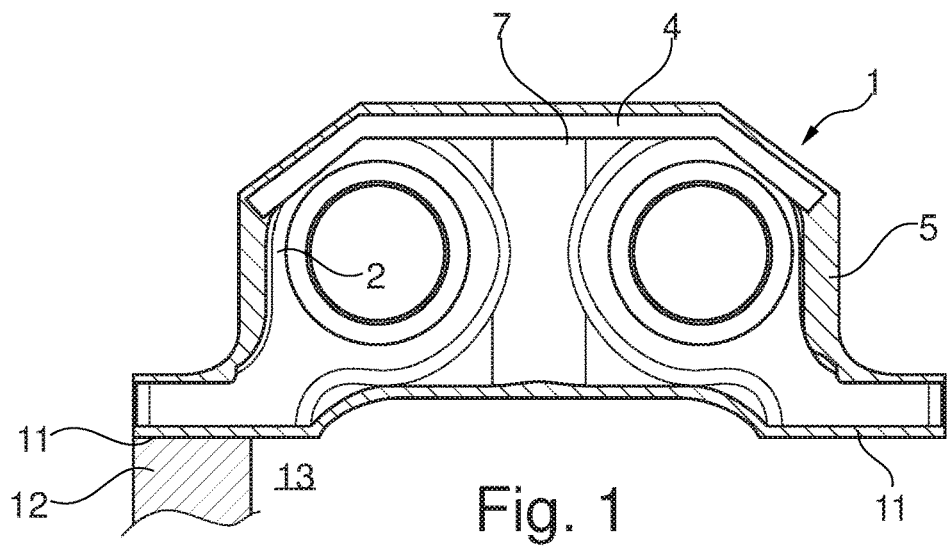
FIG. 1 is a sectional representation through a cylinder head cover according to the invention, FIG. 2A to 2E in each case four bearing bridges for mounting two camshafts, not shown, with different connection elements.
Figure 2A:
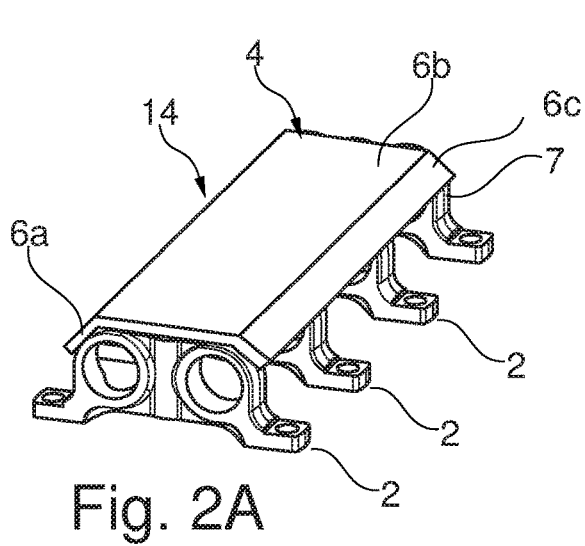
Figure 2B:
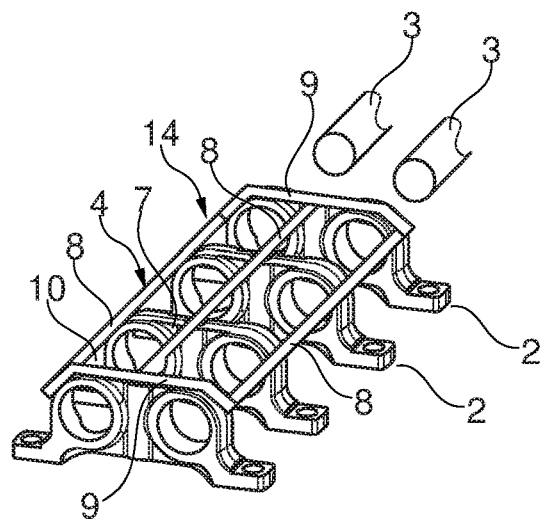
Figure 2C:
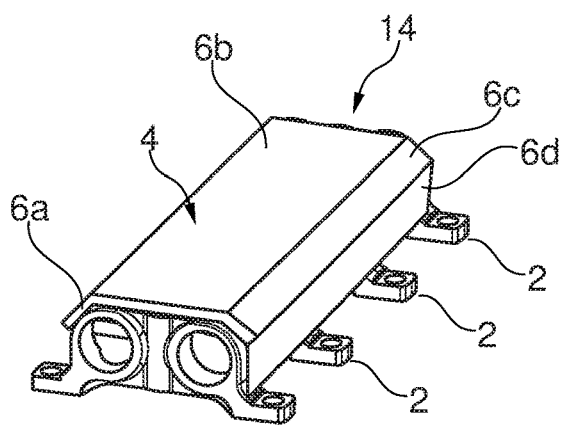
Figure 2D:
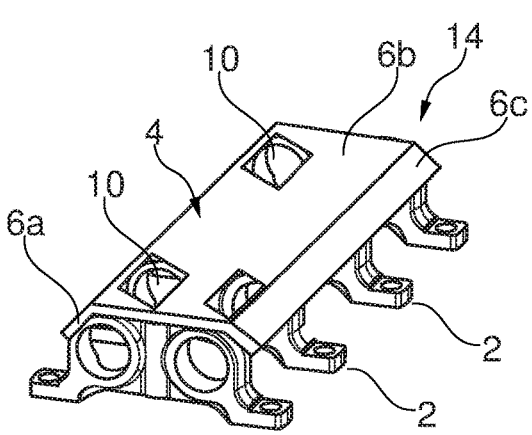
Figure 2E:
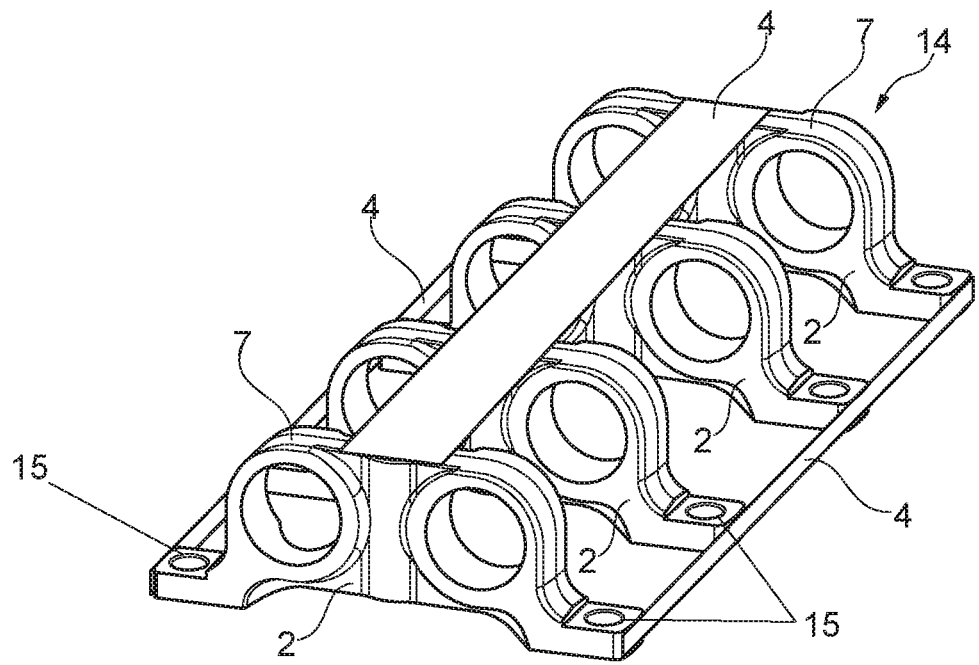
Figure 3:
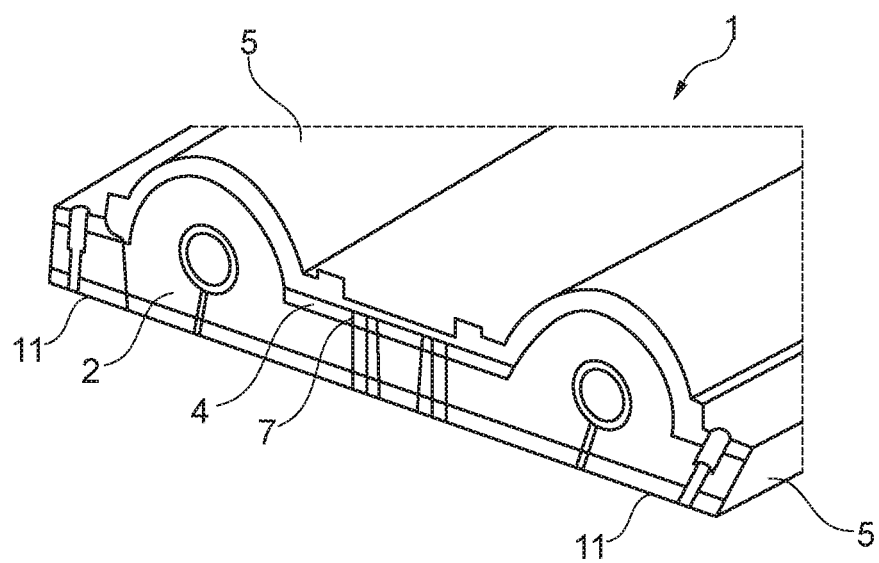
FIG. 3 is a further possible embodiment of a cylinder head cover according to the invention.

According to FIGS. 1 to 3, a cylinder head cover 1 according to the invention comprises at least two metallic bearing bridges 2 for mounting at least one, here in each case two camshafts 3 (see FIG. 2b), and at least one metallic connection element 4, which is connected to the at least two bearing bridges 2 in a fixed manner, in this case to the respective altogether four bearing bridges 2 in a fixed manner, wherein the bearing bridges 2 are aligned relative to one another and fixed on one another via at least one connection element 4. The at least two bearing bridges 2 each include one or more mounting openings 15 facilitating mounting of the cylinder head cover 1 on a cylinder head 12. As is further evident in FIGS. 1 to 3, the at least two bearing bridges 2 and the at least one connection element 4 are at least partially overmoulded with plastic 5 and the cylinder head cover 1 thereby produced.

Looking at the various embodiments of the individual connection elements 4 according to FIGS. 2a to 2e a connection element 4 is noticeable in FIG. 2a, which comprises altogether three surfaces 6a, 6b and 6c which are angled relative to one another, which at least partially encase a respective bearing back 7 of the individual bearing bridges 2. According to FIG. 1, the connection element 4 shown according to FIG. 2a is additionally shown in a frontal view.

Looking at the connection element 4 according to FIG. 2b it is evident that the same, in the representation chosen there, has a lattice-like structure with longitudinal webs 8 and transverse webs 9. By way of this lattice-like structure a comparatively stiff connection element 4 can be created similar as by way of the structure with multiple surfaces 6a, 6b, 6c which are angled relative to one another, but which with respect to its resources consumption and also with respect to its weight is advantageous. In addition, the use of plastic 5 has the great advantage that the cylinder head cover 1 altogether is given a damping in particular a vibration-damping outer cover and thereby achieves a certain damping effect.

According to FIG. 2, a connection element 4 is shown which in addition to the connection element 4 shown according to FIG. 2a additionally has a further surface 6d, as a result of which the stiffness can be increased even further. In this case, the connection element 4 can areally lie against the bearing back 7 of the individual bearing bridges 2 or be merely punctiformly or linearly fastened there. In addition to this it is possible that the at least one connection element 4 comprises at least one opening 10 (see FIG. 2d), in particular an oil filling opening or a screw-in opening for fastening attachment units such as for example sensors, as a result of which not only weight saving but additionally also an individual adaptation to a wide range of desired cylinder head covers 1 is possible. However, alternatively, at least two, preferentially three, rail-like connection elements 4 (see FIG. 2e) can also be provided, which connect the individual bearing bridges 2 with one another in the manner of longitudinal webs.

Independently of the selected embodiment of the connection elements 4, these are welded, soldered, screwed, riveted, glued to the at least two bearing bridges 2 or connected to one another via a form-fit connection. Such a form-fit connection can be achieved for example by way of a connection element 4, as is shown in FIG. 1. Obviously, a connection by way of dowels or bolts is also conceivable.

In the completed state, the cylinder head cover 1 comprises at least one sealing contour 11, for example a sealing surface, as is shown in FIGS. 1 and 3. By way of such a sealing contour 11, the cylinder head cover 1 can be connected to a cylinder head 12 (see FIG. 1) of an internal combustion engine 13. Such a sealing contour 11 can be produced for example together with the over moulding with plastic 5 in a single plastic injection moulding process or subsequently be moulded onto the already completed cylinder head cover 1.

The cylinder head cover 1 according to the invention is produced as follows: initially, at least two metallic bearing bridges 2 for mounting at least one camshaft 3 are aligned relative to one another and subsequently connected to one another in a fixed manner via at least one metallic connection element 4, so that the aligned bearing bridges 2 are fixed in their relative position with respect to one another. Following this, a bearing frame 14 comprising at least two bearing bridges 2 and the at least one connection element 4 is at least partially overmoulded with plastic 5, in particular in a plastic injection mould. By adapting the plastic injection mould, different appearances and also different outer geometries of the cylinder head cover 1 can be comparatively easily produced here, in particular with respect to a logo.

Altogether, the cylinder head cover 1 according to the invention can thus be produced comparatively easily and cost-effectively yet extremely flexibly.

Following the over moulding of the bearing frame 14 at least partially with plastic 5 and thus following the production of the actual cylinder head cover 1, further attachment parts such as for example actuators, sensors or similar can obviously be attached. The at least one connection element 4 formed as a metal strip can for example have a plate thickness of 3-4 mm, wherein depending on the embodiment the connection element 4 can have a thicker or thinner plate thickness. In the case of a connection element 4 shown according to FIGS. 2a and 2c, a thinner plate thickness can be selected because of the multiple surfaces 6a to 6d which are arranged angled with respect to one another, since the contour per se already has a high stiffness. The connection between the at least one connection element 4 and the at least two bearing bridges 2 can obviously be effected via a spot welding or laser welding, but also via soldering, clinching, stamping or deep drawing. Pinning is also possible.

Through the cylinder head 1 according to the invention, the following advantages can be achieved:
  increasing the stiffness of the overall module,
  reducing the total weight through plastic regions,
  improving the damping behaviour by using plastic 5,
  simplifying the cylinder head assembly through the cylinder head cover 1 including camshafts 3,
  additional increasing of the stiffness through stamped metal skeleton structures,
  incorporation of additional units and attachment parts in openings 10 possible.

The invention claimed is:

1. A method for producing a cylinder head cover, comprising:
  providing at least two metallic bearing bridges including a respective through-opening for mounting at least one camshaft and aligning the respective through-opening of the at least two bearing bridges axially relative to one another, the at least two bearing bridges respectively including at least two mounting openings disposed on radially opposite sides of the respective through-opening via which the at least two bearing bridges are couplable to a cylinder head, and at least two outer side surfaces respectively disposed radially outside each of the at least two mounting openings relative to the respective through-opening;
  connecting at least one metallic connection element to the at least two bearing bridges in a fixed manner so that the at least two bearing bridges are fixed and aligned relative to one another; and
  at least partially overmoulding the at least two bearing bridges and the at least one connection element with a plastic material;
  wherein connecting the at least one connection element to the at least two bearing bridges includes coupling a plurality of rail-like connection elements in a parallel arrangement respectively to a corresponding one of the at least two outer side surfaces of each of the at least two bearing bridges; and
  wherein at least partially overmoulding the at least two bearing bridges and the at least one connection element with the plastic material includes completely surrounding the at least two bearing bridges with the plastic material radially and axially relative to an axis of the respective through-opening such that an outside surface of the at least two bearing bridges is completely covered with the plastic material.

2. The method according to claim 1, wherein connecting the at least one connection element to the at least two bearing bridges includes at least one of welding, soldering, screwing, riveting, gluing, pinning and form-fitting the at least one connection element and the at least two bearing bridges together.

3. The method according to claim 1, further comprising forming at least one opening in the at least one connection element.

4. The method according to claim 1, wherein at least partially overmoulding the at least two bearing bridges and the at least one connection element with the plastic material includes forming a sealing surface via the plastic material on the at least two bearing bridges for engaging a cylinder head.

5. The method according to claim 1, wherein connecting the at least one connection element to the at least two bearing bridges includes disposing the plurality of rail-like connection elements and a plurality of transverse webs on the at least two bearing bridges to form a lattice-like structure.

6. The method according to claim 1, wherein connecting the at least one connection element to the at least two bearing bridges includes at least partially encasing a back of the at least two bearing bridges with the at least one connection element such that at least two surfaces of the at least one connection element are angled with respect to one another.

7. The method according to claim 1, wherein connecting the at least one connection element to the at least two bearing bridges includes fixing a plate-like structure to a back of the at least two bearing bridges.

8. The method according to claim 1, wherein at least partially overmoulding the at least two bearing bridges and the at least one connection element with the plastic material includes injection moulding the at least one connection element together with the at least two bearing bridges in a plastic injection mould such that a plastic overmould covers a back of each of the at least two bearing bridges and forms a sealing contour on a side of the at least two bearing bridges opposite the back.

9. The method according to claim 1, wherein a longitudinal extent of the plurality of rail-like connection elements are arranged axially to the respective through-opening of the at least two bearing bridges and the plurality of rail-like connection elements are arranged spaced apart transversely from one another.

10. The method according to claim 1, wherein connecting the at least one connection element to the at least two bearing bridges further includes coupling at least one of the plurality of rail-like connection elements to a back surface extending transversely to the at least two outer side surfaces of each of the at least two bearing bridges.

11. The method according to claim 1, wherein:
  the at least two bearing bridges each include another respective through-opening which, together with the respective through-opening, define two through-openings disposed axially parallel and adjacent to one another between the at least two mounting openings; and connecting the at least one connection element to the at least two bearing bridges further includes coupling at least one of the plurality of rail-like connection elements to a back surface of the at least two bearing bridges extending transversely between the two through-openings.

12. A cylinder head cover, comprising:

at least two metallic bearing bridges having a respective receiving opening for mounting a camshaft, the at least two bearing bridges arranged axially aligned to one another with respect to the respective receiving opening;

at least one metallic connection element including a plurality of rail-like connection elements arranged spaced apart transversely from one another and each having a longitudinal extent arranged axially to the respective receiving opening of the at least two bearing bridges, the plurality of rail-like connection elements connected to the at least two bearing bridges and fixedly connecting the at least two bearing bridges together; and a plastic overmould at least partially covering the at least two bearing bridges and the at least one connection element, wherein the plastic overmould completely surrounds the at least two bearing bridges radially and axially relative to an axis of the respective receiving opening such that an outside surface of the at least two bearing bridges is completely covered by the plastic overmould;

wherein the at least two bearing bridges respectively include at least two mounting openings disposed on radially opposite sides of the respective receiving opening via which the at least two bearing bridges are couplable to a cylinder head, and at least two outer side surfaces respectively disposed radially outside each of the at least two mounting openings relative to the respective receiving opening; and wherein the plurality of rail-like connection elements are respectively arranged on and coupled to a corresponding one of the at least two outer side surfaces of each of the at least two bearing bridges in a parallel arrangement.

13. The cylinder head cover according to claim 12, wherein the plurality of rail-like connection elements respectively have a plate-like structure, and wherein at least one of the plurality of rail-like connection elements is connected to a back of the at least two bearing bridges disposed between the at least two outer side surfaces.

14. The cylinder head cover according to claim 12, wherein the at least one connection element has a lattice-like structure including the plurality of rail-like connection elements and a plurality of transverse webs.

15. The cylinder head cover according to claim 12, wherein a surface of the plastic overmould defines at least one sealing contour.

16. The cylinder head cover according to claim 12, wherein the at least one connection element includes at least one of an oil filling opening and a fastening opening.

17. The cylinder head cover according to claim 12, wherein the plastic overmould surrounds the at least two bearing bridges and the plurality of rail-like connection elements to define a sealing surface on at least one surface disposed radially opposite a back relative to the respective receiving opening of each of the at least two bearing bridges.

18. The cylinder head cover according to claim 12, wherein at least one of the plurality of rail-like connection elements is arranged on and coupled to a back surface extending transversely to the at least two outer side surfaces.

19. The cylinder head cover according to claim 12, wherein:

the at least two bearing bridges include another respective receiving opening which, together with the respective receiving opening, define two receiving openings disposed axially parallel and adjacent to one another between the at least two mounting openings; and at least one of the plurality of rail-like connection elements is arranged on and coupled to a back surface of the at least two bearing bridges extending transversely between the two receiving openings.

* * * * *